（12） United States Patent
Liu et al.

(10) Patent No.: US 8,638,349 B1
(45) Date of Patent: Jan. 28, 2014

(54) HEAD-MEDIUM CONTACT DETECTION USING INTRODUCED HEAT OSCILLATION

(71) Applicant: Seagate Technology LLC, Cupertino, CA (US)

(72) Inventors: Dongming Liu, Eden Prairie, MN (US); Kenneth Haapala, Plymouth, MN (US); Scott E. Ryun, Chaska, MN (US); Lin Zhou, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/793,803

(22) Filed: Mar. 11, 2013

(51) Int. Cl.
*G11B 21/12* (2006.01)
*G11B 5/455* (2006.01)

(52) U.S. Cl.
USPC ............................................. 346/78; 360/75

(58) Field of Classification Search
USPC ........................................ 360/69, 75; 346/78
See application file for complete search history.

(56) References Cited

U.S. PATENT DOCUMENTS

| 7,800,858 | B1 | 9/2010 | Bajikar et al. |
| 8,098,450 | B2 | 1/2012 | Baumgart et al. |
| 8,523,312 | B2 * | 9/2013 | Zheng et al. ..................... 347/19 |
| 2003/0058559 | A1 * | 3/2003 | Brand et al. .................... 360/31 |
| 2008/0225426 | A1 * | 9/2008 | Roy et al. ........................ 360/31 |
| 2012/0050907 | A1 | 3/2012 | Haapala |
| 2012/0099218 | A1 * | 4/2012 | Kurita et al. .................... 360/59 |
| 2012/0120519 | A1 * | 5/2012 | Kunkel et al. ................... 360/59 |
| 2012/0120522 | A1 * | 5/2012 | Johnson et al. ................. 360/75 |
| 2012/0120527 | A1 * | 5/2012 | Kunkel et al. ............. 360/235.4 |
| 2012/0120982 | A1 * | 5/2012 | Anaya-Dufresne et al. .. 374/141 |
| 2012/0201108 | A1 * | 8/2012 | Zheng et al. .............. 369/13.26 |

* cited by examiner

*Primary Examiner* — Huan Tran
(74) *Attorney, Agent, or Firm* — Hollingsworth Davis, LLC

(57) ABSTRACT

An apparatus includes a head transducer configured to interact with a magnetic recording medium and a heater configured to thermally actuate the head transducer. A thermal sensor at or near the head transducer is configured to produce a sensor signal. Circuitry is coupled to the heater and configured to cause an oscillation in heater power. The heater power oscillation causes an oscillation in the sensor signal. A detector is coupled to the thermal sensor and configured to detect head-medium contact using the oscillating sensor signal and heater power.

22 Claims, 9 Drawing Sheets

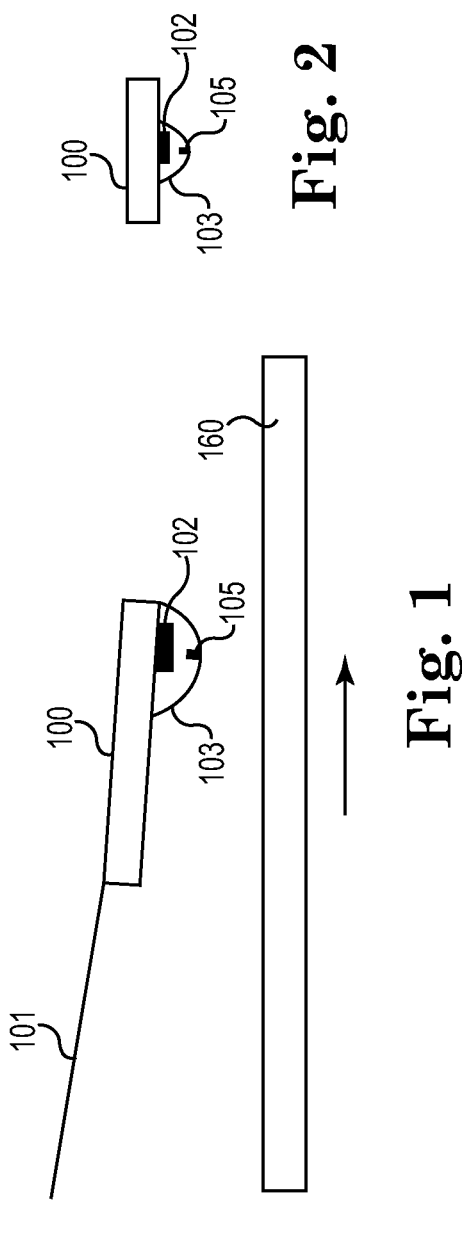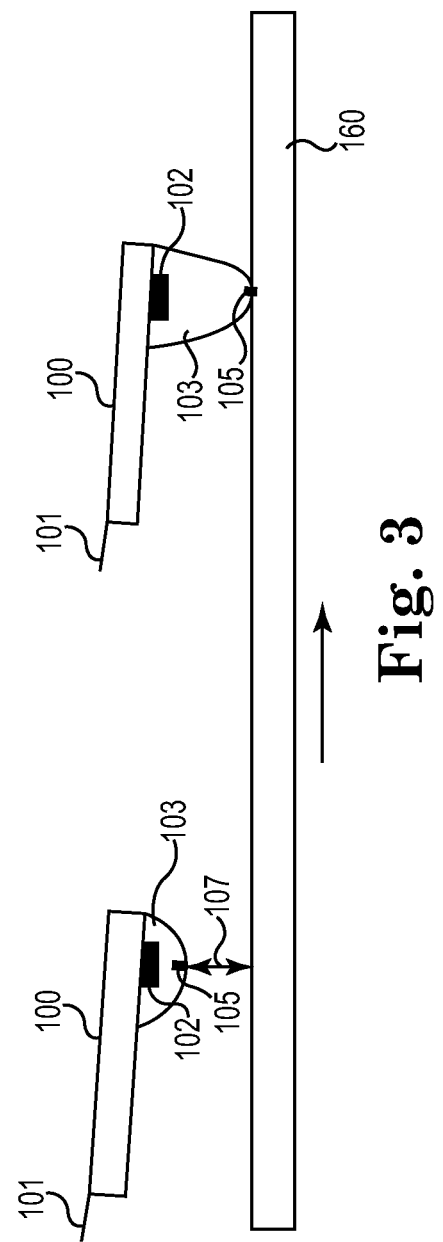

HEAD-MEDIUM CONTACT DETECTION USING INTRODUCED HEAT OSCILLATION

SUMMARY

Embodiments of the disclosure are directed to an apparatus which includes a head transducer configured to interact with a magnetic recording medium and a heater configured to thermally actuate the head transducer. A thermal sensor at or near the head transducer is configured to produce a sensor signal. Circuitry is coupled to the heater and configured to cause an oscillation in heater power. The heater power oscillation causes an oscillation in the sensor signal. A detector is coupled to the thermal sensor and configured to detect head-medium contact using the oscillating sensor signal and heater power.

Other embodiments are directed to a method that involves causing an oscillation in power supplied to a heater of a head transducer, and causing, by the oscillating heater power, an oscillation in a signal produced by a thermal sensor at the head transducer. The method also involves measuring the signal produced by the thermal sensor, and detecting head-medium contact using the measured sensor signal and heater power.

These and other features and aspects of various embodiments may be understood in view of the following detailed discussion and accompanying drawings.

BRIEF DESCRIPTION OF THE DRAWINGS

FIG. 1 is a simplified side view of a heater-actuated head transducer arrangement which incorporates a temperature coefficient of resistance (TCR) sensor in accordance with various embodiments;

FIG. 2 is a front view of the heater-actuated head transducer arrangement shown in FIG. 1;

FIG. 3 shows the heater-actuated head transducer arrangement of FIGS. 1 and 2 in a pre-actuated configuration and an actuated configuration;

DETAILED DESCRIPTION

Figure 4:
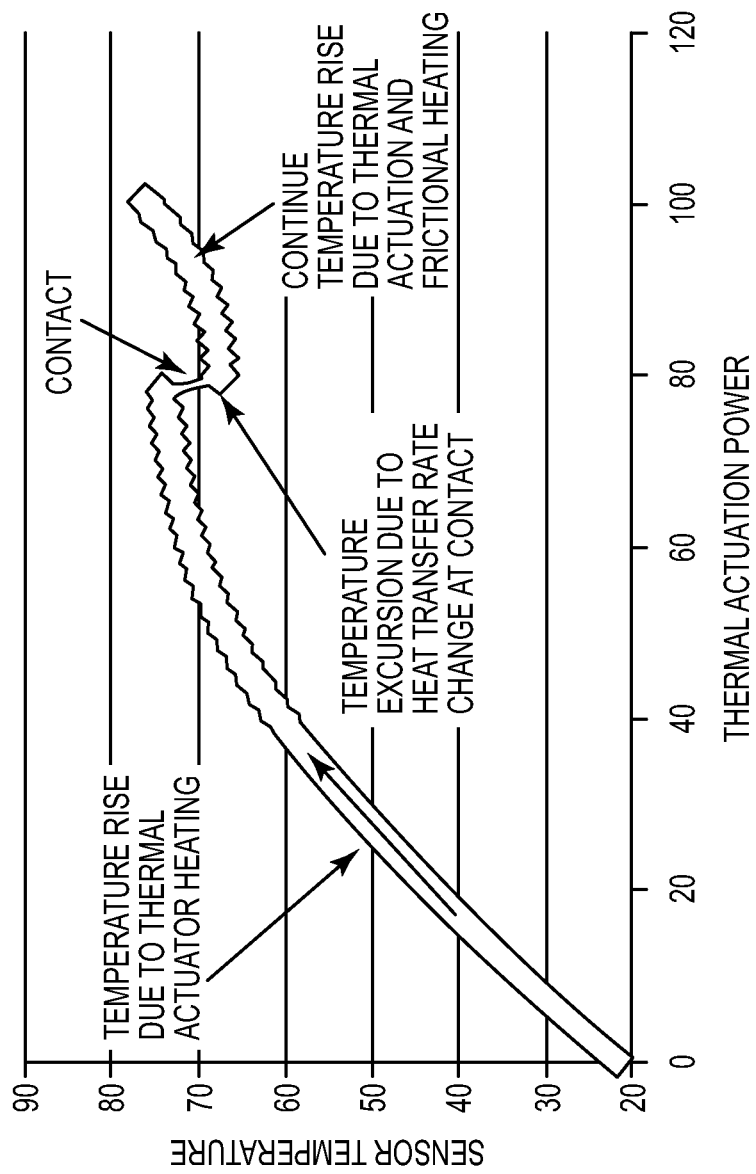
FIG. 4 illustrates a representative temperature profile for a heater-actuated recording head transducer of the type shown in FIGS. 1-3 before, during, and after contact between the head transducer and a surface of a magnetic recording disk.

Data storage systems commonly include one or more recording heads that write and read information to and from a recording medium. It is often desirable to have a relatively small distance or spacing between a recording head and its associated media. This distance or spacing is known as "fly height" or "head-media spacing." By reducing the head-media spacing, a recording head is typically better able to both write and read data to and from a medium. Reducing the head-media spacing also allows for surveying of recording medium topography, such as for detecting asperities and other features of the recording medium surface. Head-media contact detection and/or head-media spacing sensing technologies are important for the performance and reliability of magnetic storage systems. Higher contact detection repeatability enables lower active clearance, and thus higher recording density. Higher contact detection sensitivity reduces wear and improves reliability.

In accordance with various embodiments, and with reference to FIGS. 1-3, a slider 100 is shown supported by a suspension 101 in close proximity to a rotating magnetic storage medium 160. The slider 100 supports a recording head transducer 103 and a heater 102 thermally coupled to the head transducer 103. The heater 102 may be a resistive heater that generates thermal heat as electrical current is passed through the heater 102. The heater 102 is not limited to resistive heaters, and may include any type of heating source. The thermal energy generated by the heater 102 causes thermal expansion of the head transducer 103. This thermal expansion can be used to reduce the head-media spacing 107 in a data storage system.

A temperature coefficient of resistance (TCR) sensor 105 is shown situated on the head transducer 103 at the close point to the magnetic recording medium 160. The close point is generally understood to be the closest point of contact between the head transducer 103 and the magnetic recording medium 160. As discussed previously, actuation of the head transducer 103 can be realized by a thermal actuator, such as the heater 102, or other actuator (e.g., a writer). Bias power is applied to the TCR sensor 105 to raise the surface temperature of the sensor 105 and an adjacent portion of the head transducer 103 to be substantially higher than the temperature of the magnetic recording medium 160. The TCR sensor 105 is preferably configured to sense changes in heat flow for detecting head-media contact and, in some embodiments, asperities of the medium 160.

As is depicted in FIG. 3, before head-media contact, there is an air gap 107 defined between the hot head surface and the relatively cool disk 160. The head transducer 103, air gap 107, and magnetic recording disk 160 define one level of heat transfer rate. When the head transducer 103 is in contact with the disk 160, such as after activation of the thermal actuator or heater 102, the direct contact between the high thermal conductivity materials of the head transducer 103 and the disk 160 significantly increases the heat transfer rate. As such, the TCR sensor 105 on the head transducer 103 senses a drop of temperature or an excursion of temperature trajectory, allowing for detection of head-media contact.

FIG. 4 illustrates a representative temperature profile for a recording head transducer 103 of the type shown in FIGS. 1-3 before, during, and after contact between the head transducer 103 and a surface of the magnetic recording disk 160. In this illustrative example, the temperature profile is represented as a steady state DC signal. When the head transducer 103 is actuated by a thermal actuator 102, the head transducer surface temperature will increase with the actuation due to the heat generated by the thermal actuator 102. The head transducer temperature will be higher than the temperature of the disk 160. As such, the disk 160 acts as a heat sink in this scenario. When the head transducer 103 contacts the disk 160, the head transducer surface temperature will drop due to a change in heat transfer rate resulting from the contact. The head transducer surface temperature will continue to increase due to thermal actuator heating and frictional heating. The change in temperature or excursion in temperature trajectory can be used to declare head-media contact.

Embodiments of the disclosure are directed to methods and apparatus for determining head-media spacing and detecting contact at the head-disk interface (HDI) based on oscillating the power supplied to a heater in a head transducer and the resulting oscillation in a thermal sensor situated at the head transducer. Embodiments of the disclosure involve oscillating the power supplied to a heater, analyzing the output of at least one thermal sensor in response to the heater oscillation, and using the output to detect head-medium spacing and/or contact. Various embodiments are directed to head-media contact detection apparatuses and methods for use with modulating air bearings. Other embodiments are directed to head-media contact detection apparatuses and methods for use with non-modulating air bearings or head-disk interfaces with stiff air bearings.

Head-media contact detection according to various embodiments can be evaluated based on one or more of (1) changes in a relationship of resistance and power associated with a resistance temperature sensor, (2) changes in phase of a signal produced by a resistance temperature sensor relative to a reference signal, and (3) an error between a curve fitted to a signal produced by a resistance temperature sensor and a reference signal. Some or all of these detection techniques can be used to detect head-media contact for modulating air bearing head-disk interfaces. Some or all of these detection techniques can be used to detect head-media contact for non-modulating air bearing head-disk interfaces.

A resistance temperature sensor has been found to be a particularly useful head-media contact detection sensor for reasons discussed previously. A resistance temperature sensor is, in essence, a thermal sensitive resistor on a pole tip. A resistance temperature sensor measures the temperature change induced by all thermal condition changes from air pressure, clearance, and contact, among other changes. For an air bearing, head transducer cooling efficiency improves with reduced clearance to the media due to an increase in thermal transport efficiency. Head transducer cooling efficiency reaches a maximum when the head transducer contacts the media because the media provides an efficient thermal sink to the head transducer. According to embodiments of the disclosure, head-media contact can be detected by monitoring the interface cooling efficiency that is not caused by head modulation.

The DC signal from a resistance temperature sensor is dominated by heater element-based heating. The resistance change caused by interface cooling/heating represents only a fraction of that caused by the heater element of the resistance temperature sensor. It is generally difficult to know with certainty where head-media contact occurs based on a DC resistance measurement. Embodiments of the disclosure relate to detecting head-media contact using a resistance measurement from a resistance temperature sensor whose output signal has an oscillation caused by a heat generating component of the transducer head, such as a heater.

One measure of the head-to-disk interface cooling condition is the rate of the temperature rise over heater power, or $\Delta R/\Delta P$ (e.g., dR/dP), in response to heater power oscillation. The ratio of $\Delta R/\Delta P$ decreases with a better cooling condition, and reaches a minimum at head-media contact. $\Delta R/\Delta P$ increases again after head-media contact due to frictional heating. The head-media contact can be detected by monitoring the metric $\Delta R/\Delta P$ instead of the head modulation. $\Delta R/\Delta P$ deviates (drops) from a linear trend first before it reaches the minimum. This signature indicates the cooling caused by initiation of the head-media contact. The minimum point of $\Delta R/\Delta P$ indicates full head-media contact and that heat is generated by friction. Various methods of detecting head-medium contact utilize the rate of the temperature rise in a head transducer over heater power supplied to a head transducer heater.

Figure 5:
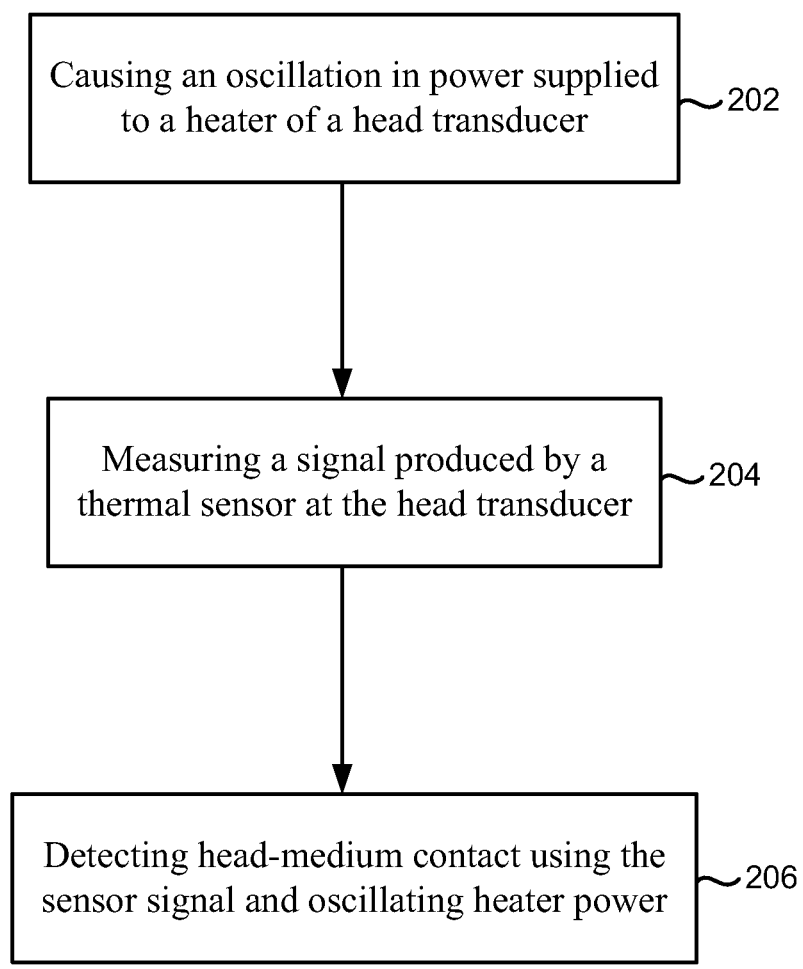
FIGS. 5-7 are flow charts showing various processes of methods for detecting head-media contact and/or head-media spacing changes in accordance with various embodiments.

With reference to FIG. 5, a method for detecting head-medium contact is shown in accordance with various embodiments. According to the embodiment shown in FIG. 5, power supplied to a heater located on a head transducer is oscillated 202. The heater power is oscillated by increasing and decreasing power supplied to the heater using an oscillating source signal. An example source signal is a servo system signal. Alternatively, the source signal can be supplied by programming a controller existing in, or added to, head transducer arrangement. A thermal sensor at the head transducer is biased with a DC current such that the temperature of the resistive element of the thermal sensor is significantly different (e.g., higher) than that of the magnetic storage medium.

In response to the oscillating heater power, the thermal sensor at the head transducer measures 204 a resulting change in temperature and produces a modulated sensor signal. The frequency of sensor signal modulation corresponds to the frequency at which the heater power is modulated. Modulating the power supplied to the heater effectively causes the thermal sensor to produce an AC signal whose frequency and amplitude correspond to that of heater power modulation. The thermal sensor can be a TCR sensor such that measuring the change in temperature is effected by measuring the resistance change of the TCR sensor. Head-medium contact is detected 206 using the measured sensor signal and the oscillating heater power. More specifically, head-medium contact can be detected using different metrics involving a change in the sensor signal and a change in the heater power.

Figure 6:
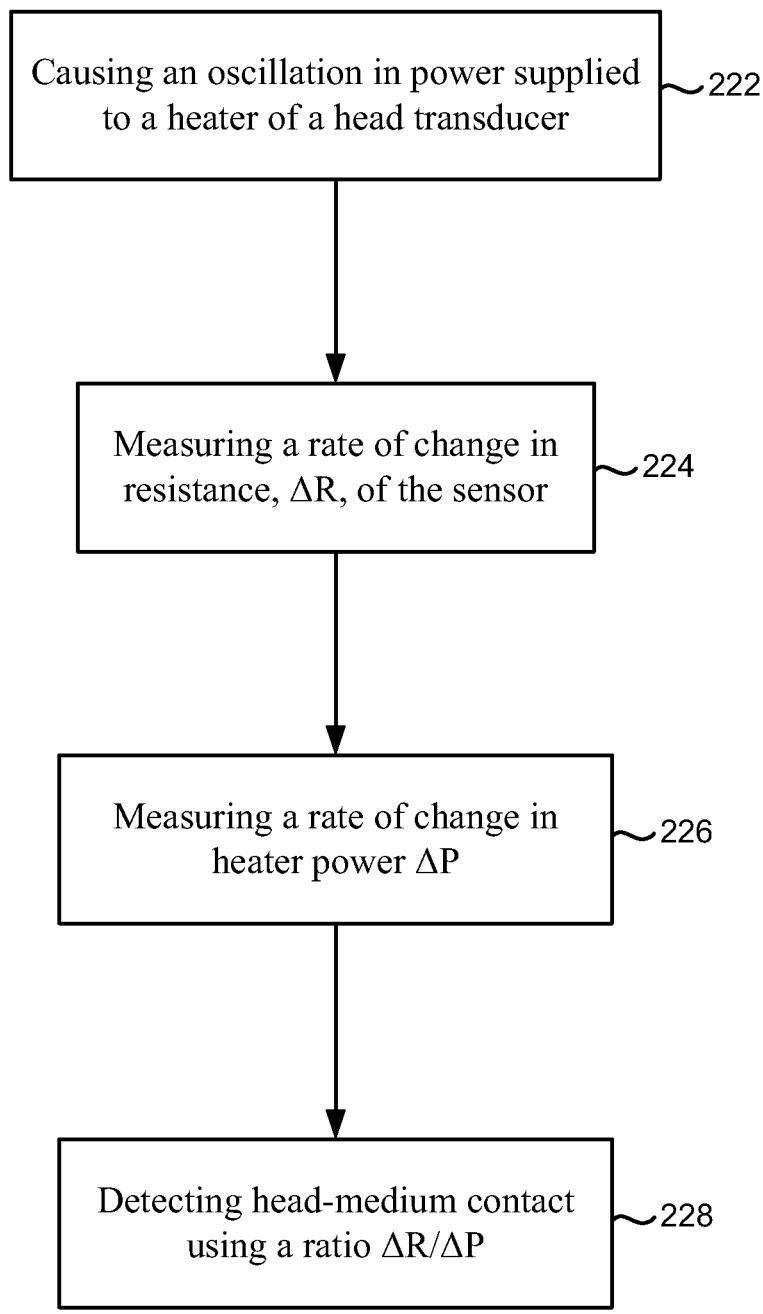

FIG. 6 is a flow chart showing a method of detecting head-medium contact which is particularly useful for a low- or non-modulation head-to-medium interface in accordance with various embodiments. It is understood that the method shown in FIG. 6 is also useful for detecting head-medium contact for a modulating head-to-medium interface in accordance with other embodiments. With a head transducer moving relative to a magnetic recording medium and defining a low- or non-modulation head-to-medium interface therebetween, method embodiments involve actuating the head transducer using a heater. Actuating the head transducer includes oscillating 222 the power supplied to the heater. In response to the oscillating power, the rate of change in resistance ($\Delta R$) of a thermal sensor located at the head transducer is measured 224. An example thermal sensor may be a TCR sensor, such as a dual-ended temperature coefficient of resistance sensor (DETCR). The rate of change in heater power ($\Delta P$) is also measured 226. The change in resistance and the change in heater power are used to produce a detection metric. For example, using the ratio of the rate of change in resistance ($\Delta R$) to the rate of change in heater power ($\Delta P$), head-medium contact can be detected 228.

The ratio of a rate of change in resistance ($\Delta R$) to a rate of change in power ($\Delta P$), denoted $\Delta R/\Delta P$, provides a metric for evaluating head-media spacing and performing head-media contact detection. The metric $\Delta R/\Delta P$ decreases linearly with decreasing head-to media clearance. Detecting a deviation from linearity in $\Delta R/\Delta P$ and a minima indicates head-media contact and head-media caused cooling and frictional heating. Such an approach does not rely on air bearing modulation for contact detection. However, this technique of detecting head-medium contact can be used with both modulating and non-modulating air bearings, as previously discussed.

Figure 7:
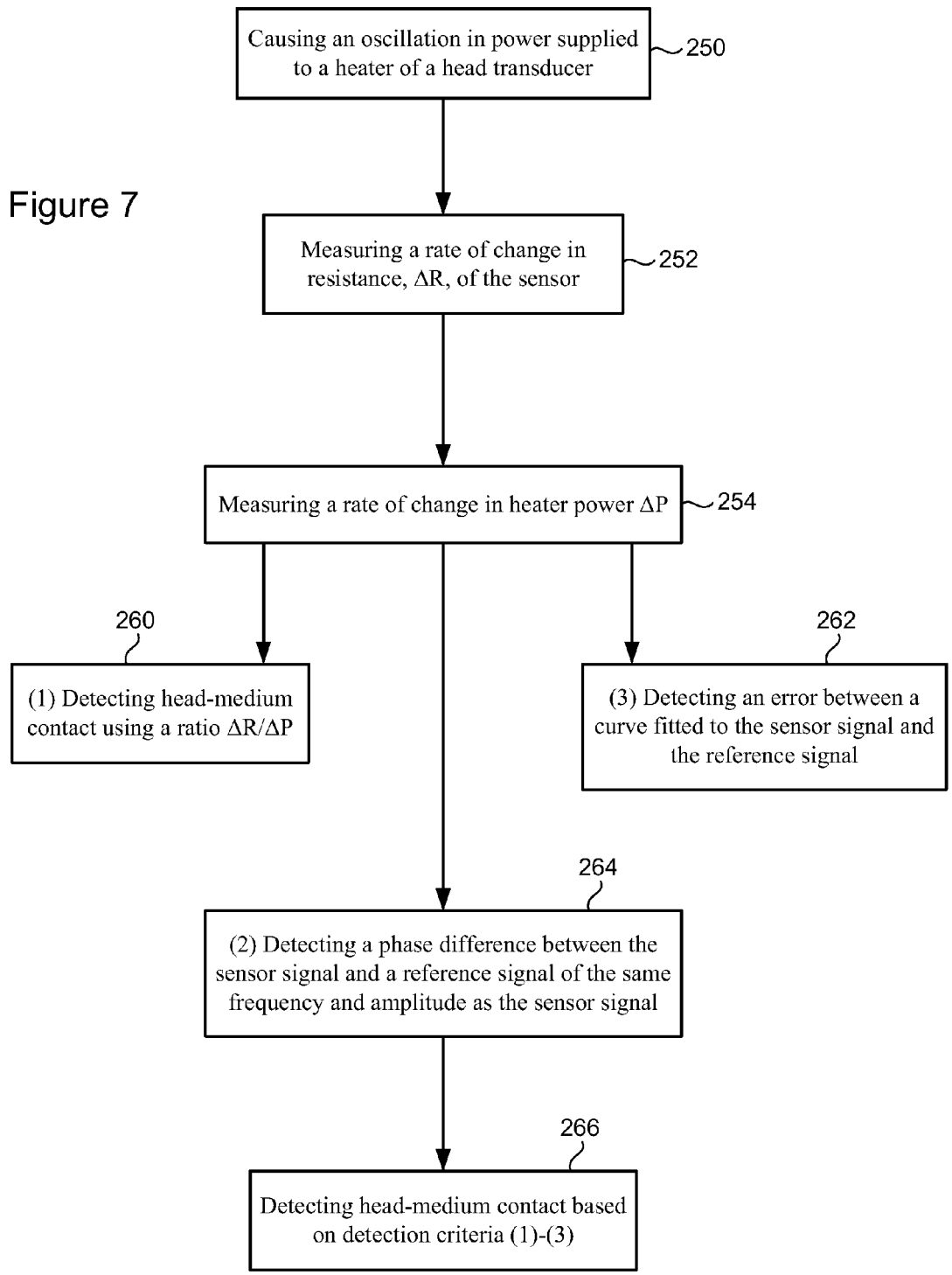

FIG. 7 illustrates another method of detecting head-medium contact using one or more detection metrics according to various embodiments. The heater of a head transducer is actuated with an oscillating power supply 250. In response to the oscillating power supplied to the heater, the rate of change in temperature/resistance ($\Delta R$) of a thermal sensor situated at the head transducer is measured 252. The rate of change in the oscillating heater power (ΔP) is also measured 254. Head-medium contact can be detected using at least three detection metrics. The following detection metrics can be used alone or in combination as disclosed.

Using a first metric, as discussed above in connection with FIG. 6, head-medium contact is detected 260 directly using the ratio ΔR/ΔP. For example, detecting a minimum in the ratio ΔR/ΔP identifies head-medium contact. In addition, detecting a deviation in the ratio from a linear fitting, for example, of more than about 3 sigma of the linear fitting error, indicates a significant decrease in the air gap such that contact is to be expected.

A second metric involves using the oscillating power supply control signal as a reference signal 264. Since the frequency of the oscillating power supply control signal is pre-selected, the frequency is known. Because the thermal sensor signal is dominated by the temperature of the heater element, the frequency of the sensor signal largely corresponds to that of the oscillating control signal supplied to the heater. Thus, the thermal sensor signal at the measured frequency can be compared to the reference signal at the known frequency. Differences between the sensor and reference signals will be substantially consistent until head-medium contact occurs, at which point the thermal sensor signal is no longer dominated by the heater element. For example, the phase of the sensor and reference signals will be substantially consistent until a head-medium contact event occurs, at which time the phase of the sensor signal deviates significantly from that of the reference signal. When a difference between the sensor and reference signal phase deviates by a predetermined threshold, such as a phase change greater than about 5% of a cycle, (e.g., 0.3 radians for a 500 Hz oscillation), head-medium contact is detected.

Alternatively, the sensor signal at the measured frequency and a measured amplitude is compared to the reference signal at the known frequency and amplitude. Differences between the frequency and amplitude of the sensor and reference signals can similarly be used to identify head-medium contact. Measuring a difference between the sensor and reference signals can also include measuring a difference in noise. For example, noise of the sensor signal is substantially constant until head-medium contact occurs, at which time the amplitude of the noise component of the sensor signal increases significantly relative to that of the pre-contact noise.

A third metric involves determining the error between a curve fit to the sensor signal and the reference signal 262. As discussed above, the thermal sensor signal largely corresponds to the oscillating power control/reference signal until head-medium contact occurs. Thus, when the sensor signal deviates from the reference signal by a predetermined error margin, head-medium contact is detected. A deviation of more than 3 sigma, for example, indicates a significant decrease in the air gap such that head-medium contact is to be expected.

Each of these metrics can be used individually or in combination to detect head-medium contact 266. For example, the first metric can at least be used alone when a non-modulating air bearing interface is involved. However, for a modulating air bearing interface, all three metrics can be used in combination to detect onset of contact earlier than with known methods. The metric(s) chosen can be based on the stiffness of the air bearing.

Figure 8:
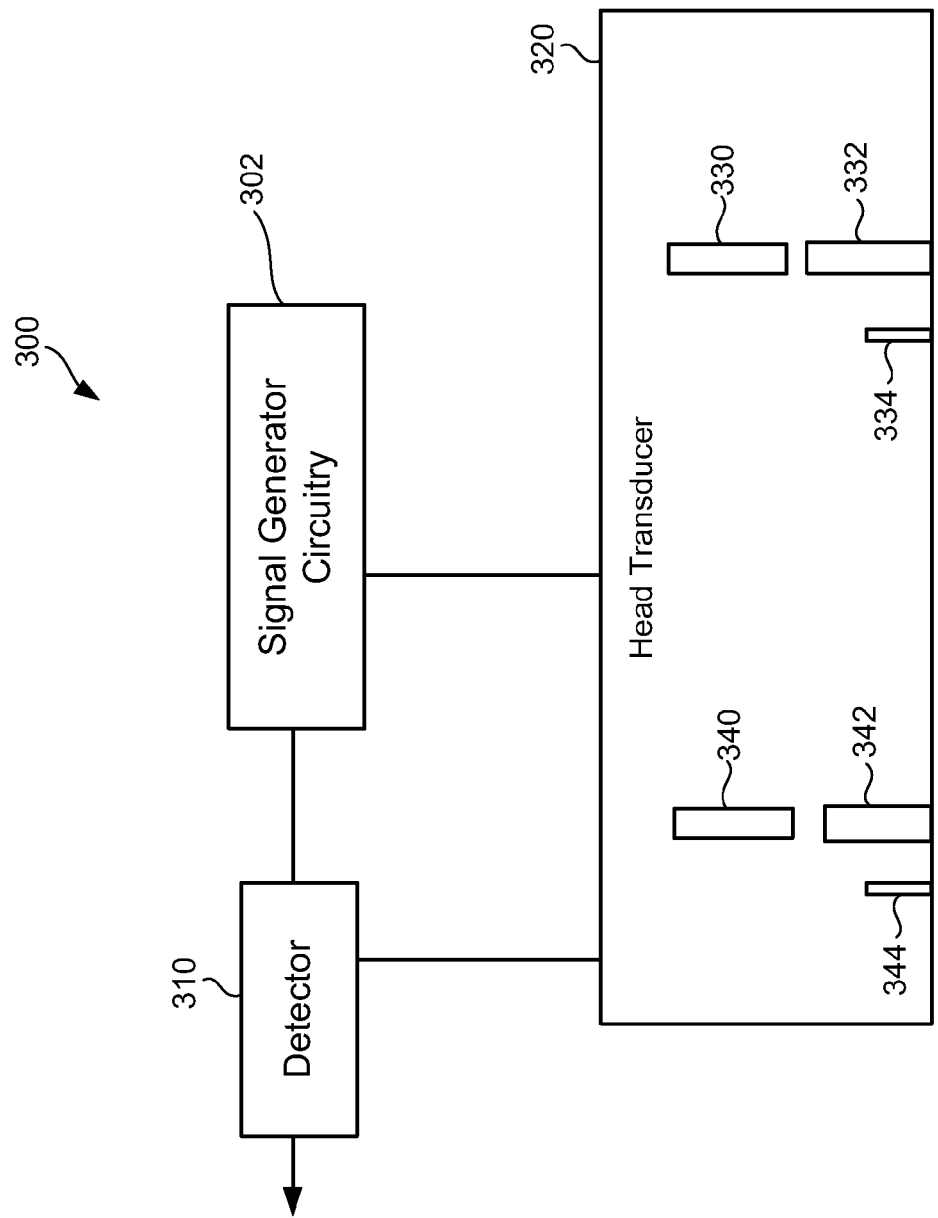
FIG. 8 is a block diagram of a heater-actuated head transducer arrangement in accordance with various embodiments.

A head transducer configured to interact with a magnetic recording medium and associated circuitry 300, as shown in FIG. 8, is used to detect head-medium contact in accordance with various embodiments. The head transducer 320 can define a non-modulation head-to-medium interface relative to the magnetic storage medium or a modulation head-to-medium interface relative to the medium. The head transducer 320 includes a read transducer 342 and a write pole 332. Head transducer 320 also includes heater 340 for applying heat to read transducer 342 and heater 330 for applying heat to write pole 332. Either heater 340 or 330 can actuate the head transducer.

In addition, each pole can include a corresponding thermal sensor, sensor 344 for read transducer 342 and sensor 334 for write pole 332. The sensors 344 and 334 are situated at the head and can be any type of thermal sensor. For example, sensors 344 and/or 334 can be a TCR sensor receiving DC current to measure a change in resistance using the DC current. Each of the sensors 344 and 334 measure temperature change used in sensing contact between the head transducer and the medium and produce a respective sensor signal. The heater that actuates the head transducer 320 determines which sensor is used to detect contact. The head transducer 320 is coupled to signal generator circuitry 302 and detector 310. It is understood that the head transducer 320 may incorporate only one thermal sensor 334, 344 and/or only one heater 330, 340 according to some embodiments.

Signal generator circuitry 302 is connected to heaters 340 and 330 to provide a control signal to oscillate the power supplied to heater 340 and/or heater 330. The signal generator circuitry can be programmable circuitry present, or introduced, to the head transducer arrangement. One example involves appropriately configuring the digital-to-analog converter (DAC) of the heater power circuit, such as by programming software of the DAC. Software control of the heater power oscillation provides for increased flexibility to specify the waveform applied to the heater 340, 330. This allows use of a variety of waveforms to drive the heater 340, 330, including square, sine, triangle, or other waveforms that can enhance the contact detection signal. Alternatively, the signal generator circuitry includes servo circuitry already present within the magnetic recording system. In certain embodiments, a frequency of the heater power oscillation is related to the frequency of servo patterns on the magnetic recording medium (a few hundred Hertz, such as 500 Hz). Heaters 340 and 330 each include a heater element and a power circuit that receives the power control signal.

Detector 310 is coupled to the sensors 344 and 334 and configured to detect head-medium contact using the resulting oscillating sensor signal and heater power. Head-medium contact is detected using one or more metrics based on a change in resistance of a sensor 344, 334 and a change in heater power. According to some embodiments, the ADC used to measure the TCR DC voltage level has a range of n bits. Detector 310 includes an DC offset cancellation DAC such that the change in sensor resistance caused by the oscillating heater power is measurable using the n bit range of the ADC.

Figure 9:
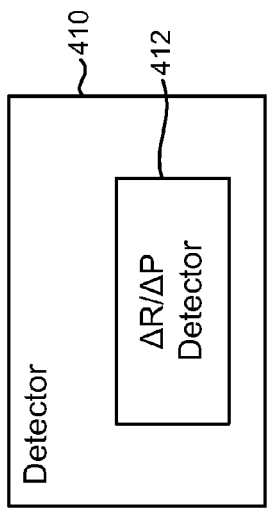
FIGS. 9-10 are block diagrams of detectors in accordance with various embodiments.

A detector for detecting head-medium contact for a non-modulated, low-modulated, or modulated head-to-medium interface is illustrated in FIG. 9 in accordance with various embodiments. The detector 410 includes a detector 412 configured for detecting head-medium contact using a metric based on a rate of change in resistance of the sensor and a rate of change in heater power. An example detection metric is the ratio ΔR/ΔP. The detector 412 can make a direct in situ measurement of ΔR/ΔP as a thermal sensor response to induced heater oscillation of dP amplitude. As discussed above, head-medium contact is identified by detecting a minimum of ΔR/ΔP since this is the point at which the head temperature ceases dropping due to the medium's heat sink behavior and instead begins to increase due to friction between the head and medium. Using additional metrics, head-medium contact can be detected more quickly for a modulating air bearing.

Figure 10:
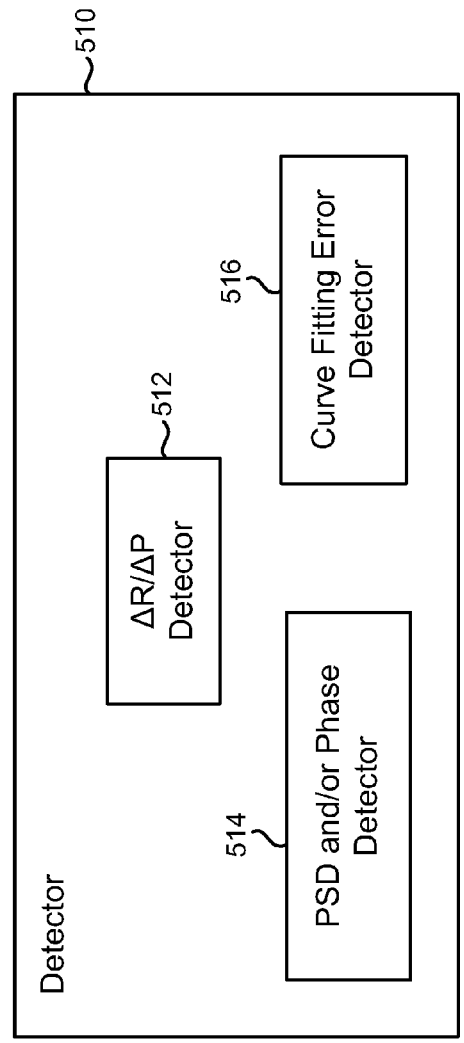

FIG. 10 illustrates a detector for detecting head-medium contact for a modulating head-to-medium interface according to various embodiments. The detector 510 is configured to use a combination of metrics to detect contact. For example, similar to the above, detector 510 includes detector 512 which is configured to determine the ratio $\Delta R/\Delta P$ and detect contact by identifying a minimum of $\Delta R/\Delta P$.

Detector 510 also includes a power spectral density (PSD) detector 514. In some embodiments, the PSD detector 514 compares the power spectrum of the thermal sensor signal to that of a reference signal, and the resulting difference (e.g., different frequency components and/or power deviations of greater than 5-10% for common frequency components) serves as another metric for detecting head-medium contact. The oscillating power control signal serves as a reference signal.

In other embodiments, the PSD detector 514 may be implemented as a phase detector configured to compare the phase of the thermal sensor signal to that of a reference signal for determining additional metrics. The oscillating power control signal serves as a reference signal since the frequency and amplitude are known. For example, the PSD 514 can be configured to compare the phase of the reference signal at the known frequency to that of the thermal sensor signal at the measured frequency to obtain the difference. The resultant phase difference (if any) will continue to be consistent until contact between the transducer head and medium surface occurs. When a difference in phase between the sensor and reference signals reaches a predetermined level, head-medium contact is detected.

Detector 510 further includes a curve fitting error detector 516 configured to determine an error between a curve fitted to the sensor signal and the reference signal. Since the sensor signal tracks the reference signal until head-medium contact is made, monitoring the error between the sensor signal and a curve fit to the reference signal identifies head-medium contact.

Detector 510 is typically configured to use each of the detectors 512, 514, and 516 to identify head-medium contact for a modulating advanced air bearing. For a non- or low-modulating advanced air bearing, detector 510 can be configured to use less than all three detectors, for example, detector 512 to identify head-medium contact. However, the phase shift and fitting error metrics can detect contact earlier than the $\Delta R/\Delta P$ metric in various embodiments.

It can be appreciated that performing accurate direct resistance measurements with DC current can be challenging for the drive electronics. For example, sensor resistance changes caused by the interface heating and cooling condition change is typically less than about 10% of its mean resistance. Considering the resolution of the analog-to-digital converter (ADC) in a typical magnetic storage system is 8 bits, it would be difficult to measure the resistance directly to less than 0.1 Ohm accuracy.

As discussed previously hereinabove, one approach according to various embodiments involves measuring the $\Delta R/\Delta P$ directly in a magnetic storage system using a TCR sensor (e.g., a DETCR sensor). Such an approach measures the $\Delta R$ caused by an intentionally introduced $\Delta P$ heat oscillation on top of the mean heat of the thermal sensor. Phase detector can be used to lock in the frequency to detect the resistance change from the resistance temperature sensor.

Figure 11:
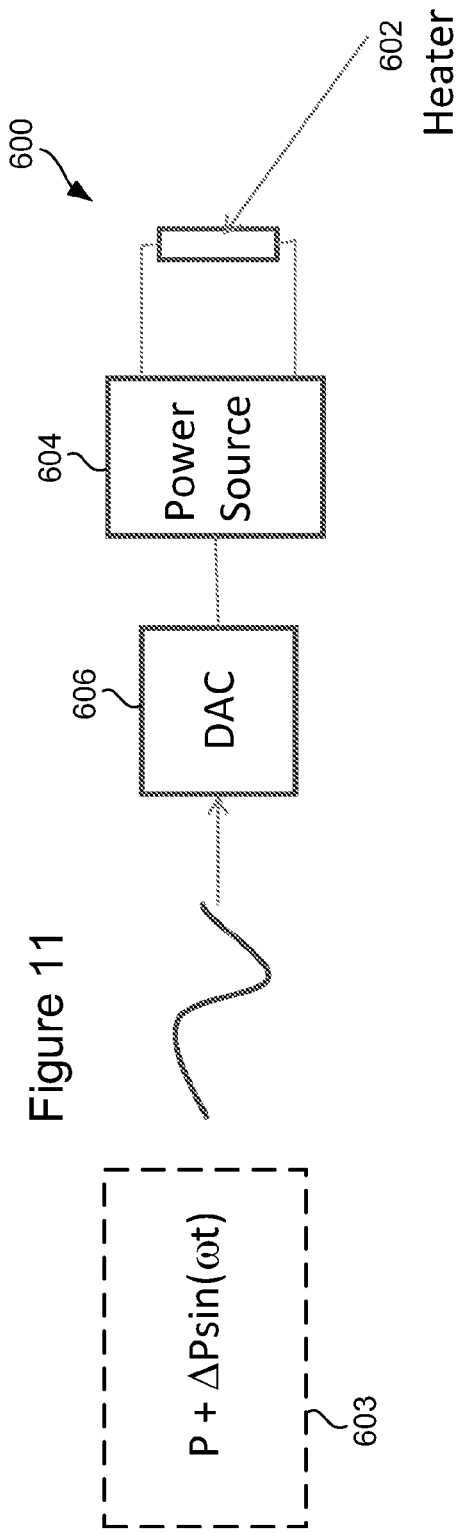
FIGS. 11-12 are block diagrams of control circuitry in accordance with various embodiments.
Figure 12:
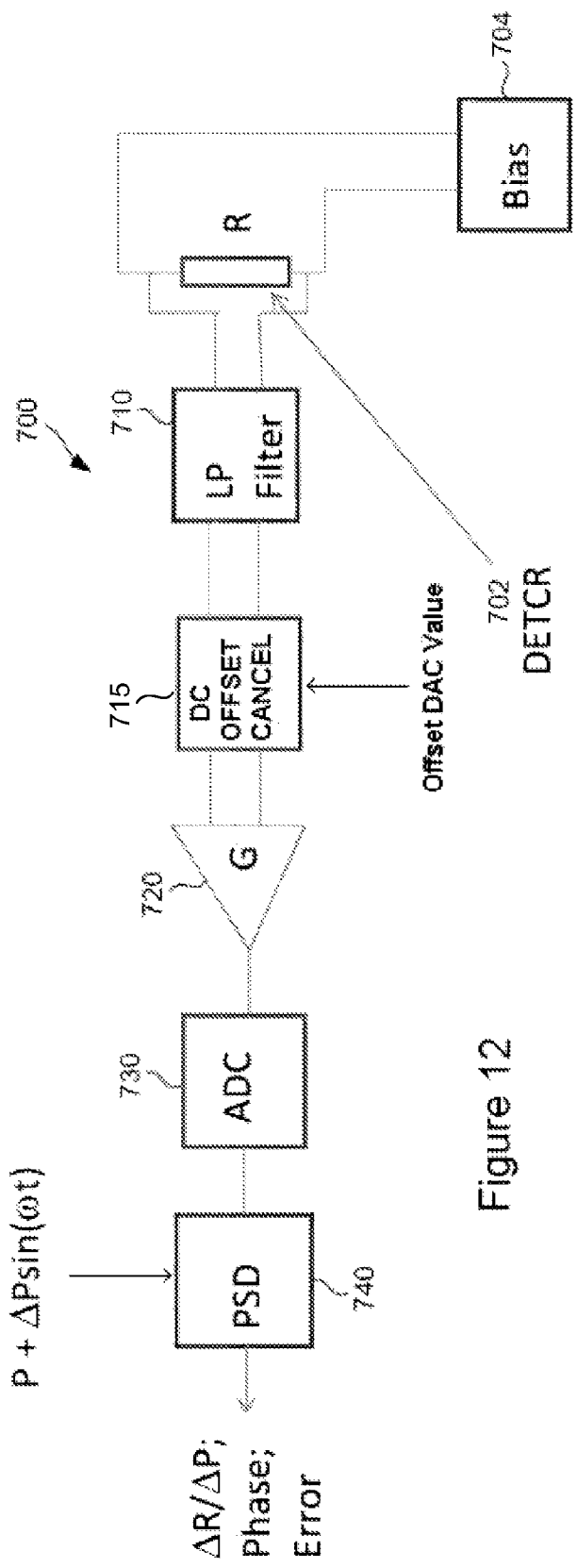

A direct measurement of the $\Delta R/\Delta P$ within a magnetic storage system can be achieved using a scheme implemented by the representative circuitry 600, 700 shown in FIGS. 11 and 12, respectively. In the embodiment shown in FIG. 11, a servo system 603 is coupled to a power circuit (comprising DAC 606 and power source 604) of a heater element 602. The heater element power in a magnetic storage system is proportional to the DAC counts. A programmable DC offset value from unit 715 is used to cancel the mean DC output at each heater DAC, thus the resistance change caused by the oscillation heat can use the full 8 bits DAC range. The oscillation is introduced at each servo wedge as a fixed low frequency (e.g., 500 Hz and +/−2 heater DAC) sine wave. The servo firmware also samples the DC response of the resistance temperature sensor 702 to the heat oscillation at every servo wedge. The DC cancellation removes the mean DC signal from an analog-to-digital converter (ADC) 730, so that the full 8 bit range is used for the low frequency response caused by the heat oscillation.

The embodiment of FIG. 12 illustrates a PSD 740, coupled to the resistance temperature sensor 702 via a low pass filter 710, an amplifier 720, and ADC 730, configured to measure the resistance temperature sensor response at the oscillation frequency, i.e., the $\Delta R$ caused by this $\Delta P$. Resistance temperature sensor 702 is illustrated as a DETCR sensor supplied with bias current 704. After processing by phase sensitive detection circuitry 740, a sensor signal is produced. In generating the sensor signal, the phase sensitive detection circuitry 740 uses the oscillating signal from the servo system as a reference signal. A phase sensitive detection algorithm (e.g., lockin algorithm, or Discrete Fourier Transform) can be used to measure the sensor's response at the oscillation frequency. In addition to calculating the amplitude ($\Delta R$), the phase between the sensor response and the reference signal, and the error of the curve fitting can also be calculated at each heater DAC.

Head-medium contact can be detected by monitoring all three signals ($\Delta R/\Delta P$, phase, error) concurrently. For a typical modulating air bearing, the modulation happens at proximity of the solid contact. The fitting error increases due to this modulation. The phase shift occurs too due to extra cooling introduced by contact between the transducer head and the medium. The $\Delta R/\Delta P$ continues to decrease until reaching a minimum a few DACs later. For a non-modulating AAB, the phase shift signature and fitting error signature may not be detected. However, the minimum $\Delta R/\Delta P$ can always be used to detect contact. For any air bearing, head-media contact can be detected by monitoring the $\Delta R$ response of the resistance temperature sensor 702, which is preferably a DETCR sensor situated at or near the close point. The oscillation frequency can be introduced using the existing servo firmware without adding extra hardware according to various embodiments.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:
1. An apparatus, comprising:
   a head transducer configured to interact with a magnetic recording medium;
   a heater configured to thermally actuate the head transducer;
   a thermal sensor situated at or near the head transducer and configured to produce a sensor signal;

circuitry coupled to the heater and configured to cause an oscillation in heater power, the heater power oscillation causing an oscillation in the sensor signal; and a detector coupled to the thermal sensor and configured to detect head-medium contact using the oscillating sensor signal and heater power.

2. The apparatus of claim 1, wherein the thermal sensor has a temperature coefficient of resistance.

3. The apparatus of claim 1, wherein the detector is configured to detect head-medium contact using a metric based on a change in resistance of the sensor and a change in heater power.

4. The apparatus of claim 1, wherein the detector is configured to detect head-medium contact using a metric based on a rate of change in resistance of the sensor and a rate of change in heater power.

5. The apparatus of claim 4, wherein the detection metric is defined by a ratio $\Delta R/\Delta P$, where $\Delta R$ is a rate of change in resistance of the sensor and $\Delta P$ a rate of change in heater power.

6. The apparatus of claim 5, wherein the detector is configured to make a direct in situ measurement of $\Delta R/\Delta P$ as a thermal sensor response to induced heater oscillation of dP amplitude.

7. The apparatus of claim 5, wherein the detector is configured to detect head-medium contact by detecting a minimum of the ratio $\Delta R/\Delta P$.

8. The apparatus of claim 1, wherein:
the circuitry is configured to generate a reference signal to cause the oscillation in heater power; and
the detector is configured to detect a phase difference between the sensor and reference signals.

9. The apparatus of claim 1, wherein:
the circuitry is configured to generate a reference signal to cause the oscillation in heater power; and
the detector is configured to detect an error between a curve fitted to the sensor signal and the reference signal.

10. The apparatus of claim 1, wherein:
the circuitry is configured to generate a reference signal to cause the oscillation in heater power; and
the detector is configured to detect a difference in noise between the sensor and reference signals.

11. The apparatus of claim 1, wherein the head transducer is configured to define a non-modulation head-to-medium interface relative to the medium.

12. The apparatus of claim 1, wherein the head transducer is configured to define a modulation head-to-medium interface relative to the medium.

13. The apparatus of claim 1, wherein:
the circuitry comprises servo circuitry; and
a frequency of the heater power oscillation is related to a frequency of servo patterns on the magnetic recording medium.

14. The apparatus of claim 1, wherein the detector is configured to detect head-medium contact for a modulating air bearing using:
(1) a rate of change in resistance of the sensor and a rate of change in heater power;
(2) a phase difference between the sensor signal and a reference signal of the same frequency as the sensor signal; and
(3) an error between a curve fitted to the sensor signal and the reference signal.

15. The apparatus of claim 1, wherein the detector is configured to detect head-medium contact for a non-modulating air bearing using at least a rate of change in resistance of the sensor and a rate of change in heater power.

16. A method, comprising:
causing an oscillation in power supplied to a heater of a head transducer;
causing, by the oscillating heater power, an oscillation in a signal produced by a thermal sensor at the head transducer;
measuring the signal produced by the thermal sensor; and
detecting head-medium contact using the measured sensor signal and heater power.

17. The method of claim 16, wherein detecting head-medium contact comprises:
measuring a rate of change in resistance, $\Delta R$, of the sensor;
measuring a rate of change in heater power, $\Delta P$; and
detecting head-medium contact using a ratio $\Delta R/\Delta P$.

18. The method of claim 17, wherein detecting head-medium contact comprises detecting a minimum of the ratio $\Delta R/\Delta P$.

19. The method of claim 17, wherein:
causing the heater power oscillation comprises generating a reference signal; and
detecting head-medium contact comprises:
comparing the sensor signal at the frequency of oscillation to the reference signal of the same frequency; and
detecting head-medium contact in response to a phase difference between the sensor and reference signals.

20. The method of claim 17, wherein:
causing the heater power oscillation comprises generating a reference signal; and
detecting head-medium contact comprises:
comparing the reference signal to a curve fitted to the sensor signal; and
detecting head-medium contact in response to an error between the reference signal and sensor signal curve.

21. The method of claim 17, wherein detecting head-medium contact for a modulating air bearing is based on:
(1) a rate of change in measured resistance of the sensor and a rate of change in heater power;
(2) a phase difference between the sensor signal and a reference signal of the same frequency as the sensor signal; and
(3) an error between a curve fit to the sensor signal and the reference signal.

22. The method of claim 17, wherein detecting head-medium contact for a non-modulating air bearing is based on at least a measured rate of change in resistance of the sensor and a rate of change in heater power.

* * * * *